United States Patent [19]
Fermann et al.

[11] Patent Number: 5,450,427
[45] Date of Patent: Sep. 12, 1995

[54] TECHNIQUE FOR THE GENERATION OF OPTICAL PULSES IN MODELOCKED LASERS BY DISPERSIVE CONTROL OF THE OSCILLATION PULSE WIDTH

[75] Inventors: Martin E. Fermann; Donald J. Harter, both of Ann Arbor, Mich.

[73] Assignee: IMRA America, Inc., Ann Arbor, Mich.

[21] Appl. No.: 326,928

[22] Filed: Oct. 21, 1994

[51] Int. Cl.$^6$ .............................................. H01S 3/098
[52] U.S. Cl. ........................................ 372/18; 372/6; 372/102; 372/34; 372/20; 372/11; 372/12; 372/13
[58] Field of Search ....................... 372/18, 6, 102, 21, 372/27, 34, 64, 20, 700, 11-13

[56] References Cited

U.S. PATENT DOCUMENTS

| | | | |
|---|---|---|---|
| 4,972,423 | 11/1990 | Alfano et al. | 372/20 |
| 5,157,676 | 10/1992 | Wilcox | 372/25 |
| 5,257,273 | 10/1993 | Farres | 372/102 |
| 5,271,024 | 12/1993 | Huber | 372/6 |
| 5,311,525 | 5/1994 | Pantell et al. | 372/6 |
| 5,317,576 | 5/1994 | Leonberger et al. | 372/102 |
| 5,323,404 | 6/1994 | Grubb | 372/6 |
| 5,329,398 | 7/1994 | Lai et al. | 372/25 |

OTHER PUBLICATIONS

M. E. Fermann, M. Hofer, F. Haberl, A. J. Schmidt and L. Turi, Opt. Lett. 16, 244, Feb. 15, 1991, "Additive-Pulse-Compression Mode Locking of a Neodymium Fiber Laser".
S. M. J. Kelly, K. Smith, K. J. Blow and N. J. Doran, Opt. Lett., 16, 1337, Sep. 1, 1991 "Average Soliton Dynamics of a High-Gain Erbium Fiber Laser".
D. Taverner, D. J. Richardson and D. N. Payne, Opt. Soc. Am. Topical Meeting on Nonlinear Guided Wave Phenomena, Cambridge, 1993, Opt. Soc. Am. Techn. Dig. Series, 15, 367, (1993) (no month avail).
B. C. Barnett, M. N. Islam, Y. C. Chen, P. Bhattacharya, W. Riha, K. V. Reddy, A. T. Howe, K. A. Stair, H. Iwamura, S. R. Friberg and T. Mukai, Conference on Lasers and Electro-Optics, CLE094, Anaheim, Opt. Soc. Am. Techn. Dig. Ser., 8, 52, May 10, 1994.
K. Sugden and I. Bennion, A. Molony and N. J. Cooper, Electron. Lett., 30, 440, Mar. 3, 1994, "Chirped Gratings Produced in Photosensitive Optical Fibres by Fibre Deformation During Exposure".
M. Hofer, M. E. Fermann, F. Haberl, M. H. Ober and A. J. Schmidt, Opt. Lett, 16, 502, Apr. 1, 1991 "Mode Locking with Cross-Phase and Self-Phase Modulation".
F. Krausz, T. Brabec, and C. Spielmann, Opt. Lett., 16, 235, Feb. 15, 1991, "Self-Starting Passive Mode Locking".
H. A. Haus and E. P. Ippen, Opt. Lett., 16, 1331, Sep. 1, 1991, "Self-Starting of Passively Mode-Locked Lasers".

(List continued on next page.)

Primary Examiner—Léon Scott Scott, Jr.
Attorney, Agent, or Firm—Sughrue, Mion, Zinn, Macpeak & Seas; Richard C. Turner

[57]  ABSTRACT

The invention relates to modelocked lasers including highly dispersive optical elements. The dispersive optical elements increase the oscillation pulse width inside the laser oscillators, which reduces the nonlinearity of the laser cavity for a given oscillating pulse energy. Compared to conventionally designed modelocked lasers, an increase in output pulse energy by one to three orders is achieved. As way of example, the technique is applied to an erbium fiber laser, where a chirped fiber Bragg grating is employed as the dispersive element. By using a Kerr-modelocking technique, a high nonlinearity may be sustained inside the fiber laser cavity, which leads to the generation of pulses with psec widths and energies up to 2 nJ. The large bandwidth of the chirped fiber Bragg grating allows a wavelength tuning range in excess of 10 nm, which is achieved by polarization control and a control of the gain spectrum of the laser.

25 Claims, 5 Drawing Sheets

OTHER PUBLICATIONS

F. Krausz and T. Brabec, Opt. Lett., 18, 888, Jun. 1, 1993 "Passive Mode Locking in Standing-Wave Laser Resonators".

M. E. Fermann, M. J. Andrejco, M. L. Stock, Y. Silberberg and A. M. Weiner, Appl. Phys. Lett., 62, 910, Mar. 1, 1993 "Passive Mode Locking in Erbium Fiber Lasers with Negative Group Delay".

F. Krausz, M. E. Fermann, T. Brabec, P. F. Curley, M. Hofer, M. H. Ober, C. Spielman, E. Wintner and A. J. Schmidt, IEEE J. Quantum Electronics, 28, 2097, Oct. 10, 1992 "Femtosecond Solid-State Lasers".

D. U. Noske, MJ. Guy, K. Rottwitt, R. Kashyap and J. R. Taylor, Opt. Comm. 108, 297–301, Oct. 12, 1994, "Dual-Wavelength Operation of a Passively Mode-Locked figure-of eight ytterbium-erbium fibre soliton laser".

S. M. J. Kelly, Electron, Lett., 28, 806, (1992) (no month avail.).

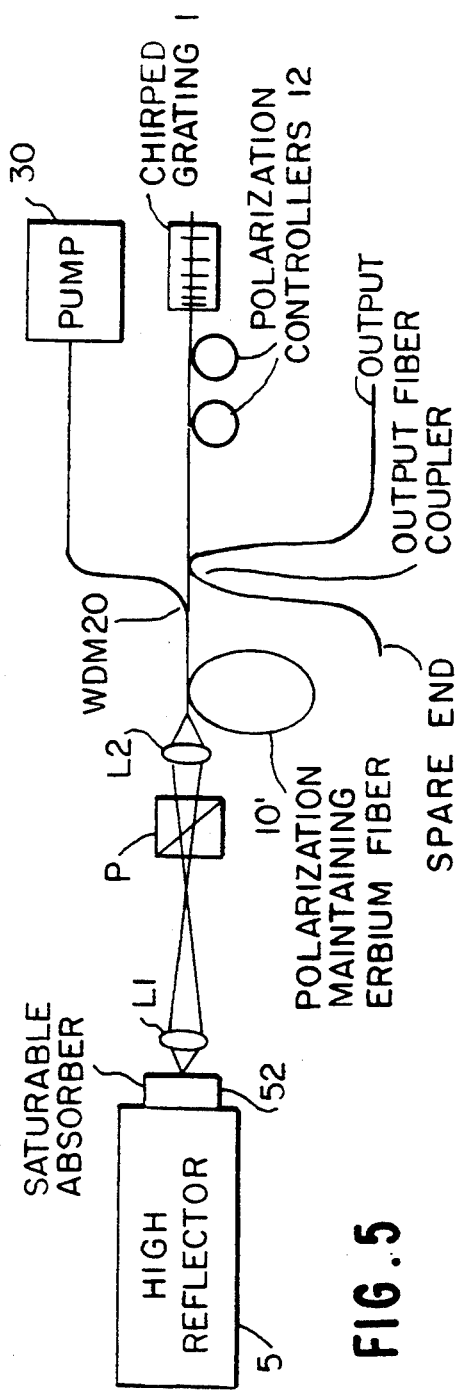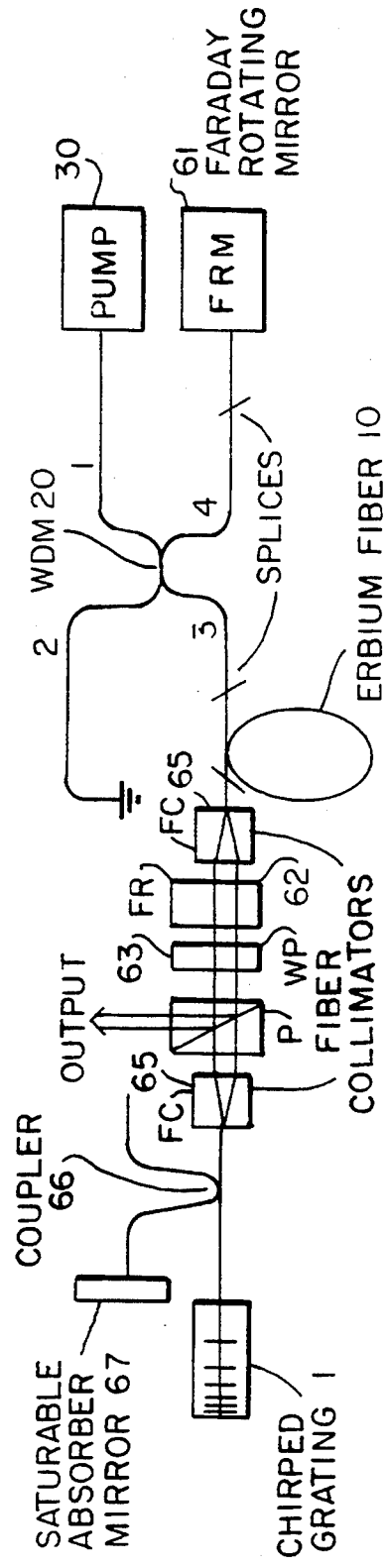

TECHNIQUE FOR THE GENERATION OF OPTICAL PULSES IN MODELOCKED LASERS BY DISPERSIVE CONTROL OF THE OSCILLATION PULSE WIDTH

BACKGROUND OF THE INVENTION

1. Field of the Invention

Many optical techniques require compact tunable laser sources of psec order optical pulses. Ideally, the pulse widths should be at the detection limit of the photodetectors, which is about 1-5 psec with current technology. Lasers based on single mode rare-earth-doped fibers are attractive candidates for such sources due to their intrinsic low volume and pump power requirements as disclosed in S. B. Poole, D. N. Payne and M. E. Fermann, Electron. Lett., 21,737 (1985). The aim of the present invention is the attainment of high output power optical pulses from such lasers through dispersive control of the pulse width.

2. Discussion of the Prior Art

Compact passively modelocked fiber lasers capable of producing pulses of shorter than 100 fsec with energies approaching 1 nJ are now well known in the art, as disclosed in M. E. Fermann, M. Hofer, F. Haberl, A. J. Schmidt and L. Turi, Opt. Lett., 16, 244 (1991). However, when the pulse widths are increased to the psec level, the pulse energies decline to (typically) just a few tens of pJ. This drop-off is mainly due to limitations set by the stability requirements for the various laser designs typically employed.

For example, bandwidth-limited psec pulses can easily be produced by actively modelocked fiber lasers; however, laser stability then requires that the non-linearity of the cavity remain low (i.e., the soliton period remain long compared to the cavity length); to this end, a nonlinear phase delay of $<0.1\pi$ should be ensured, as disclosed by S. M. J. Kelly, K. Smith, K. J. Blow and N. J. Doran, in Opt. Lett., 16, 1337 (1991). In conjunction with the large induced intra-cavity loss from standard integrated modulators and the high repetition rates typically employed, this leads to small generated pulse powers.

On the other hand, in conventional passively modelocked fiber lasers, psec pulses are generated by providing a large amount of negative dispersion (solition supporting dispersion) inside the cavity, which is achieved by using long lengths (>100 m) of optical fiber inside the cavity, as disclosed by D. Taverner, D. J. Richardson and D. N. Payne, in Opt. Soc. Am. Topical Meeting on Nonlinear Guided Wave Phenomena, Cambridge, 1993, Opt. Soc. Am. Techn. Dig. Series, 15, 367 (1993). Clearly, the possible pulse energies are then limited by the resulting large non-linearity of the cavity; in addition, the stability of such long lasers deteriorates due to the long fiber lengths employed.

Recently, bandwidth-limited, high power psec-order (2 nJ, 5 psec) pulses have been obtained from a fiber laser passively modelocked with a saturable absorber as disclosed by Barnett et al., in Opt. Soc. Am. Techn. Dig. Ser., 8, 52 (1994), which is hereby incorporated by reference herein. However, to date, questions still remain about the long-term reliability of such systems due to the susceptibility of erbium fiber lasers to Q-switching, and the low damage thresholds of typical saturable absorber materials. Further, due to the resonant nature of the employed nonlinearity for modelocking, such systems only allow for very limited tunability and require a very good match between saturable absorber and laser gain medium. Equally, there exists no simple scaling laws for such lasers, which creates great difficulties in laser design and optimization of laser performance for a given application.

Low-power psec-pulses have also been obtained by incorporating un-chirped fiber Bragg gratings into a fiber laser cavity, as described by D. U. Noske et al., Optics Communications 108 (1994) 297-301. However, due to the non-uniform dispersion profile of such gratings, the pulses are typically not bandwidth-limited and only have a very limited turning range.

SUMMARY OF THE INVENTION

The inventors have created a compact high power laser source producing high-power near-bandwidth limited psec pulses by controlling the pulse width of a Kerr-modelocked laser with a highly dispersive optical element providing a large amount of negative dispersion inside the cavity. In an exemplitive embodiment, the laser source is an erbium fiber laser, though the system can work equally well with any fiber laser gain material, with other types of waveguide lasers (e.g. doped $LiNbO_3$ waveguides), or with bulk solid state lasers or semiconductor lasers. Also, in an exemplitive embodiment, a chirped fiber grating is used as the dispersive element; however, a chirped grating in any other type of waveguide would be equally acceptable. Equally, large amounts of negative dispersion could also be produced by using bulk grating pairs. In keeping with the aim of achieving a compact design, however, fibers and waveguides are the preferable dispersion elements.

The invention uses a Kerr-modelocking technique with the fiber laser to ensure that the nonlinearity of the cavity remains approximately constant (a nonlinear phase delay of around $\pi$ is typical), which thus leads to a great increase in output pulse energy compared to conventional modelocked fiber lasers. The inventive laser system produces 3 psec pulses with an energy content in excess of 1 nJ. The large bandwidth of the chirped fiber grating allows a tuning range of 12 nm or more.

BRIEF DESCRIPTION OF THE DRAWINGS

In order that the invention be fully understood, preferred embodiments will now be described with reference to the accompanying drawings, in which:

FIG. 5 illustrates a polarization maintaining fiber laser cavity design employing a saturable absorber for modelocking.

FIG. 6 is an illustration of an environmentally stable fiber laser modelocked by nonlinear polarization evolution and employing a chirped grating for pulse width control.

DETAILED DESCRIPTION OF THE PREFERRED EMBODIMENTS

Figure 1:
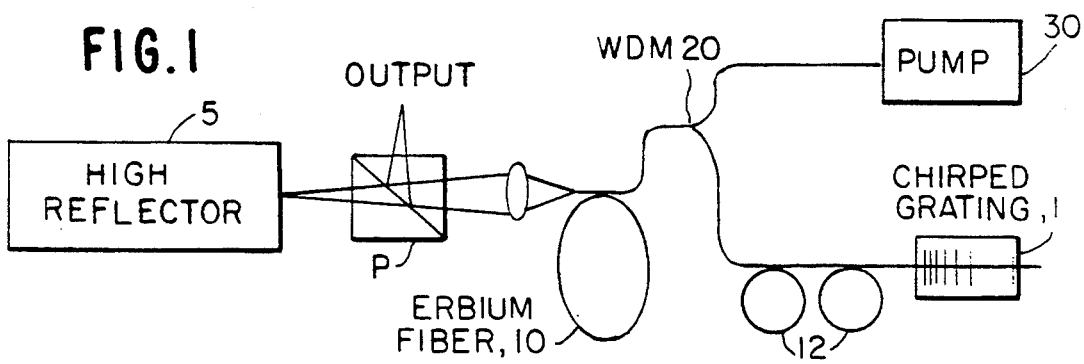
FIG. 1 is an illustration of a passively modelocked fiber laser incorporating a chirped grating for pulse width control.

A generalized illustration of the system of the invention is shown in FIG. 1. Fiber grating 1 is chirped with a bandwidth of 13 nm centered around 1.555 $\mu$m and has a maximum reflectivity near 100%. Chirped fiber gratings are per se known in the art, as disclosed by K. Sugden and I. Bennion, A. Molony and N. J. Cooper, in Electron lett., 30, 440 (1994), which is hereby incorporated by reference. The grating length is approximately 5 mm and the group-velocity dispersion (GVD) at 1.580 $\mu$m was measured by a simple pulse compression technique to be 3.40±0.05 psec$^2$. The active fiber 10 is doped with 0.12 mol % $Er^{3+}$ and has a numerical aperture of 0.16 and a cut-off wavelength of 1140 nm; the corresponding intensity spot radius is 2.6 $\mu$m. The active fiber length is 2 m; however, the necessary fiber leads require an additional length of 1.6 m of standard telecom fiber to be used in the laser cavity. The fiber laser was pumped via a wavelength-division multiplexing coupler 20 with a launched power of up to 400 mW from a master oscillator power amplifier (MOPA) laser diode 30 operating at 980 nm.

The Fabry-Perot cavity arrangement suggests nonlinear polarization evolution (NPE) as the preferred modelocking technique. For details of this technique, the reader is referred to M. Hofer, M. E. Fermann, F. Haberl, M. H. Ober and A. J. Schmidt, Opt. Lett., 16, 502 (1991), which is hereby incorporated by reference. An intra-cavity polarizer P, coupled between high reflector 5 and the active fiber 10, is used to select a single polarization in the cavity and the polarization state in the fiber laser is optimized by conventional fiber loop controllers 12. The polarizer P was also employed as an adjustable output coupler.

Since NPE modelocking is generally not reliably self-starting, mode-locking is initiated using a moving mirror technique. At a launched power of about 240 mW, single pulse operation at a fixed repetition rate of 27 MHz is consistently obtained with essentially no modelocking hysteresis. Along with very reproducible start up conditions, a very narrow cw emission bandwidth (<0.1 nm) is obtained. The RF-bandwidth of the first beat note of the cw emission is less than 1 kHz, which indicates a low level of spurious reflections inside the cavity (see, e.g., F. Krausz, T. Brabec and C. Spielmann, Opt. Lett., 16, 235 (1991) and H. A. Haus and E. P. Ippen, Opt. Lett., 16 1331 (1991). Spatial hole burning is reduced by the incorporation of a chirped grating into the laser cavity due to the lack of a fixed cavity length. This reduction is considered to be quite favorable for pulse start-up. See, generally, F. Krausz and T. Brabec, Opt. Lett., 18, 888 (1993), hereby incorporated by reference.

Figure 2A:
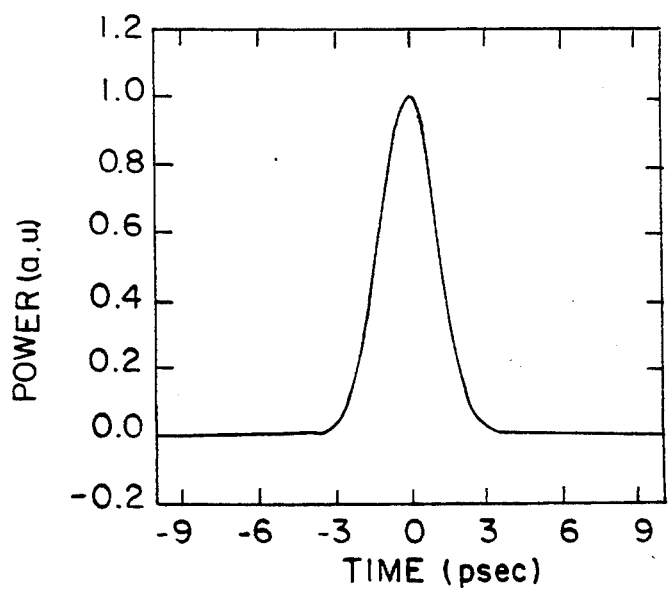
FIGS. 2 illustrate the autocorrelation (FIG. 2(a)) and corresponding pulse spectrum (FIG. 2(b)) of a 2.7 psec pulse (assuming a $sech^2$ shape). The peak of the first side band is not shown and has an intensity of 5.0.
Figure 2B:
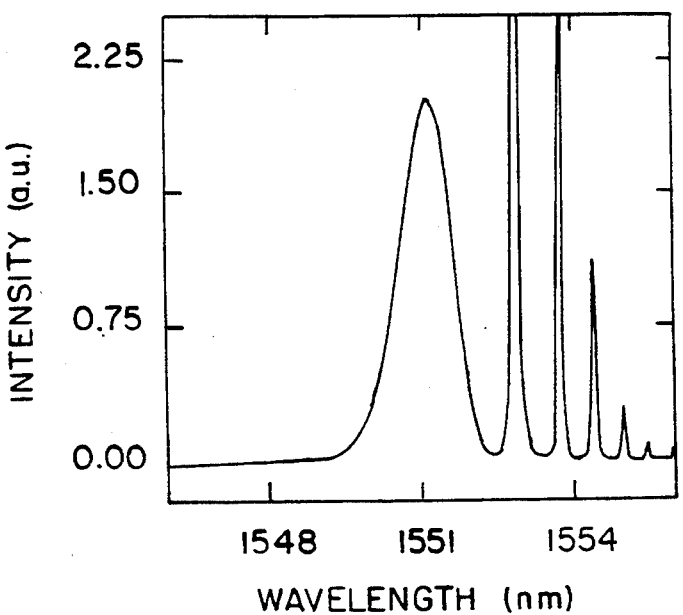

A typical autocorrelation trace and the corresponding spectrum for a 1.1 nJ pulse at 1.551 $\mu$m are shown in FIGS. 2a and 2b, respectively. The pulse width at half maximum was 2.7 psec, assuming a sech$^2$ shape, and the corresponding time-bandwidth product was calculated to be 0.40, which is close to the bandwidth limit of 0.31 for a soliton pulse. Pulse energies up to 2 nJ can be obtained by increasing the pump power, but due to the resulting large nonlinearity of the cavity most of the energy is then lost to a low-level pedestal. Due to the reflection cut-off of the grating, spectral side bands were only generated on the red side of this particular pulse spectrum, as shown in FIG. 2b. The peak of the first side band is not shown, but has an intensity of 5.0.

By adjusting the polarization state of the laser and the loss at the intra-cavity polarizer the modelocked wavelength is made tunable. Here the variation of the intra-cavity loss changes the effective gain spectrum of the erbium laser due to the quasi-four level nature of the erbium transition responsible for lasing at 1.5 $\mu$m. Thus a high intra-cavity loss and a short active fiber length favors laser emission on those wavelengths with the highest gain cross-section (1.535 $\mu$m and 1.550 $\mu$m), whereas a low intra-cavity loss and a long active fiber length favors laser emission at longer wavelengths. Typically, due to the wavelength dependence of the polarization state in the fiber, a readjustment of the polarization controllers is necessary at each emission wavelength to obtain optimum modelocking performance. The requirement for polarization control in wavelength tuning can be minimized by using a low effective birefringence in the cavity and a low birefringence chirped fiber grating.

Figure 3:
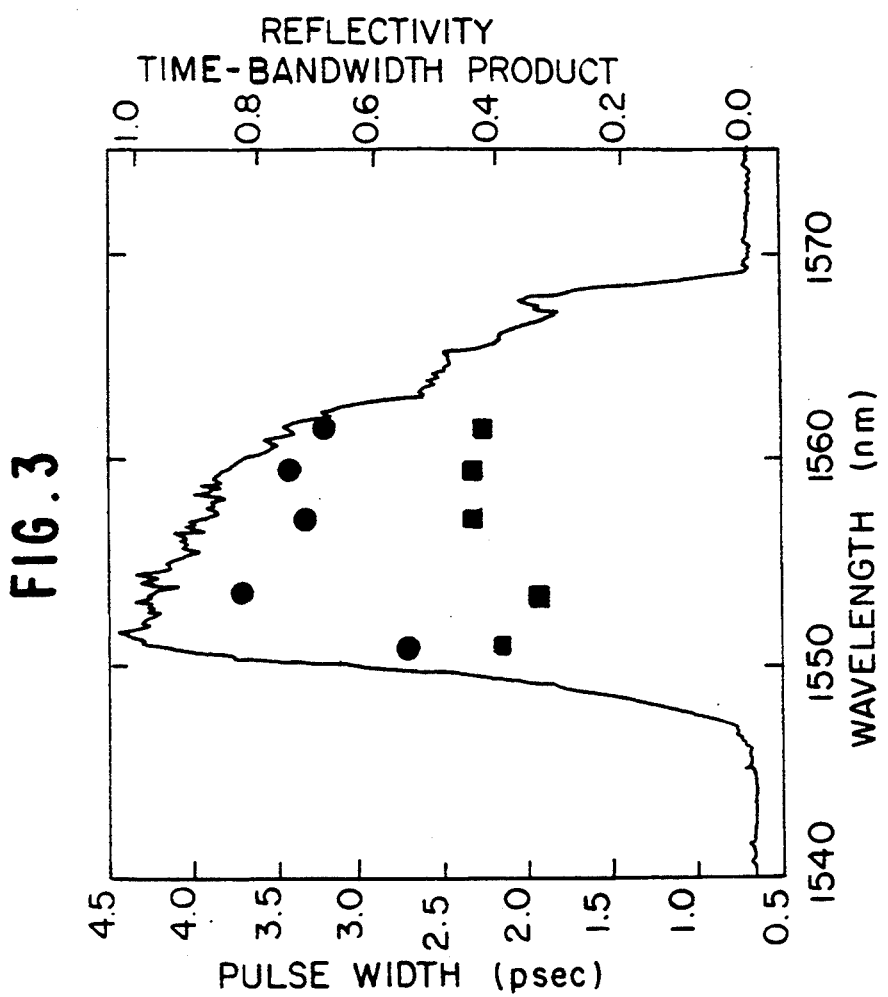
FIG. 3 illustrates the reflectivity of the chirped grating (solid line), experimentally obtained pulse widths (dots) and time-bandwidth products (squares) as a function of wavelength.

The maximum tuning range in the present laser system is between 1.550 and 1.562 $\mu$m, limited mainly by the grating reflectivity bandwidth, as seen in FIG. 3 (black squares). Near bandwidth-limited sech$^2$-shape pulses with widths between 2.7 and 3.7 psec are obtained. The measured pulse widths (black circles) and time-bandwidth products are also shown in FIG. 3. Note that continuous tuning was not possible; it was found rather that laser emission occurred at a certain set of discrete wavelengths separated by about 2 nm from each other. This is considered to be due to a small irregularity in the grating reflectivity of similar period, also as seen in FIG. 3. Smoother wavelength tuning can be obtained when employing chirped fiber gratings with a smoother reflectivity function. The pulse energies at the output generated with a pump power of 300 mW range from 1.1 nJ to 0.4 nJ with an increase in wavelength due to a change in output coupling efficiency from 93% to 35%.

For a 1.1 nJ pulse, the average nonlinear phase delay is about $\pi$ inside the cavity, which is consistent with typical erbium soliton lasers as disclosed in M. E. Fermann, M. J. Andrejco, M. L. Stock, Y. Silberberg and A. M. Weiner, Appl. Phys. Lett., 62, 910 (1993). For this nonlinearity the soliton pulse width of the cavity is 2.0 psec, which corresponds well to the observed values found by F. Krausz, M. E. Fermann, T. Brabec, P. F. Curley, M. Hofer, M. H. Ober, C. Spielmann, E. Wintner and A. J. Schmidt, IEEE J. Quantum Electronics, 28, 2097 (1992). From the location of the spectral sidebands, one can calculate a variation in the fiber grating GVD of 7.8 to 4.0 psec$^2$ for the wavelengths from 1.551 to 1.561 $\mu$m. At 1.5595 and at 1.5570 $\mu$m, these estimates gave a GVD of 4.1 psec$^2$, which corresponds well to the separately performed GVD measurement of 3.40 psec$^2$ (described previously) at 1.558 $\mu$m. The discrepancy in values is considered to be due to residual chirp on the output pulses. The small chirp on the pulses does not arise due to dispersive propagation inside the fiber, since the fiber dispersion is about two orders of magnitude smaller than the grating dispersion. Rather, the light rejected by the polarizer for output coupling induces a small chirp on the pulses.

The variation in pulse width with wavelength and the non-continuous tuning characteristics suggest, as noted above, the presence of some small irregularities in the chirped grating. Equally, at some wavelengths the pulse spectrum was non-uniform and the spacing of the spectral side bands was not proportional to the square root of the side band order as predicted by theory (see, e.g., S. M. J. Kelly, Electron Lett., 28, 806 (1992)), again due to the grating irregularities. With the elimination of these irregularities, uniformity of the pulse spectrum and a smoothly continuous tuning capability would be obtained.

Since fiber dispersion is completely irrelevant in the present system, the invention operates equally well with any fiber gain material by simply selecting the appropriate chirped fiber grating. Further, the current system scales simply with grating dispersion and cavity nonlinearity, i.e., the obtainable pulse width is approximately equal to the soliton pulse width of the system, whereas the generated pulse energy can be calculated from the maximum allowable nonlinear phase delay in the cavity for the given soliton pulse width. This allows the construction of passively modelocked psec fiber oscillators capable of delivering pulses with energies in excess of 10 nJ.

The present laser design has been only described by way of example and a similar performance could be obtained by incorporating a highly dispersive delay line, containing a chirped grating, into any type of modelocked laser.

Figure 4:
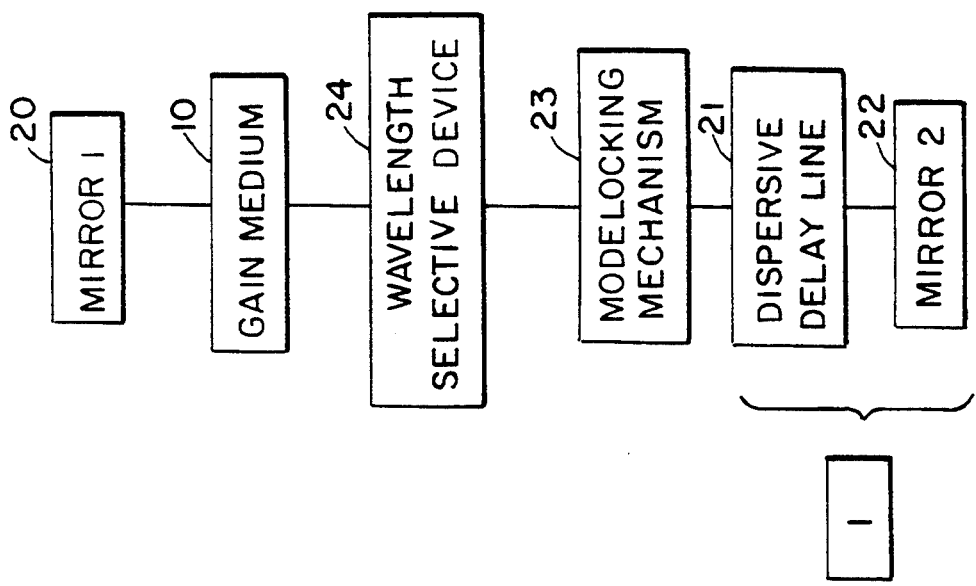
FIG. 4 illustrates a generic design of a modelocked laser including mirrors for feedback, a gain medium, a wavelength selective device for wavelength tuning, a modelocking mechanism and a dispersive delay line (including chirped gratings) for pulse width control.

A generic design of a modelocked laser including a first mirror 20, modelocking mechanism 23, a highly dispersive delay line 21 and a section 24 for wavelength tuning is shown in FIG. 4. Although the dispersive delay line 21 and mirror 2 (22) have been drawn as separate elements, a chirped grating 1, if employed, combines these two functions. Thus, it is also possible to use two chirped gratings, one on each end of the cavity. By selecting two chirped gratings with different amounts of dispersion, the amount of overall dispersion in the cavity can also be varied, essentially over the whole range from positive to negative, to optimize the performance of the system for a certain required output.

More specifically, an environmentally stable fiber laser according to the invention can be constructed by resorting to saturable absorber modelocking in a polarization maintaining fiber environment, where one end of the fiber laser cavity is constructed from a chirped fiber grating 1 and the other cavity end contains the saturable absorber 52, as shown in FIG. 5. The fiber polarization controllers 12 shown here are superfluous if the chirped grating 1 is written directly into polarization maintaining fiber and all employed fiber including active fiber 10[1] is polarization maintaining. Otherwise the length of the non-polarization maintaining fiber should be short (<1 m) to ensure environmental stability. In contrast to the prior art as exemplified by Barnett et al., Opt. Soc. Am. Techn. Dig. Ser., 8, 52 (1994), the pulse width is now not necessarily determined by the nonlinear response time of the saturable absorber 52. Rather, the generated pulse width is now mainly determined by the nonlinearity of the cavity and the cavity dispersion, whereas the saturable absorber 52 ensures that the pulses remain stable and start up from noise. This type of cavity design thus also allows a certain degree of performance scaling, which is not as easily accomplished when resorting to a laser design without large dispersive delay lines.

An alternative environmentally stable cavity design according to the invention uses nonlinear polarization evolution as the modelocking mechanism, where linear polarization phase drifts in the cavity are eliminated by the incorporation of a Faraday mirror FRM 61, and a phase bias between the polarization eigenmodes of the fiber laser is induced by the insertion of one or two waveplates WP into the laser cavity, as shown in FIG. 6. In this figure, FC are fiber collimators 65, which may be employed instead of lenses for intra-cavity collimation and focusing. P is a polarizer used for output coupling and selection of a single polarization state in the laser. Additional polarization control in front of the grating is only required if the chirped grating is written in non-polarization maintaining fiber. FRM is a Faraday rotating mirror 61, FR is a 45 deg. Faraday rotator 62, and WP represents the one or two wave-plates 63 used for intra-cavity polarization control. The erbium fiber 10 can be either polarization maintaining or have low birefringence depending on the stability requirements for the laser. The coupler 66 is optional and provides means to couple the laser cavity to a saturable absorber mirror 67 for pulse start up.

The laser fiber can be polarization maintaining or consist of low birefringence fiber depending on whether a complete insensitivity to mechanical perturbations of the laser fiber is required. Start up of modelocking can then be obtained by a mechanical perturbation of the cavity (i.e., via a moving mirror or an applied perturbation to the fiber) or by the inclusion of a saturable absorber 67 into the cavity either directly or via a coupler 66 to an external cavity.

Figure 7:
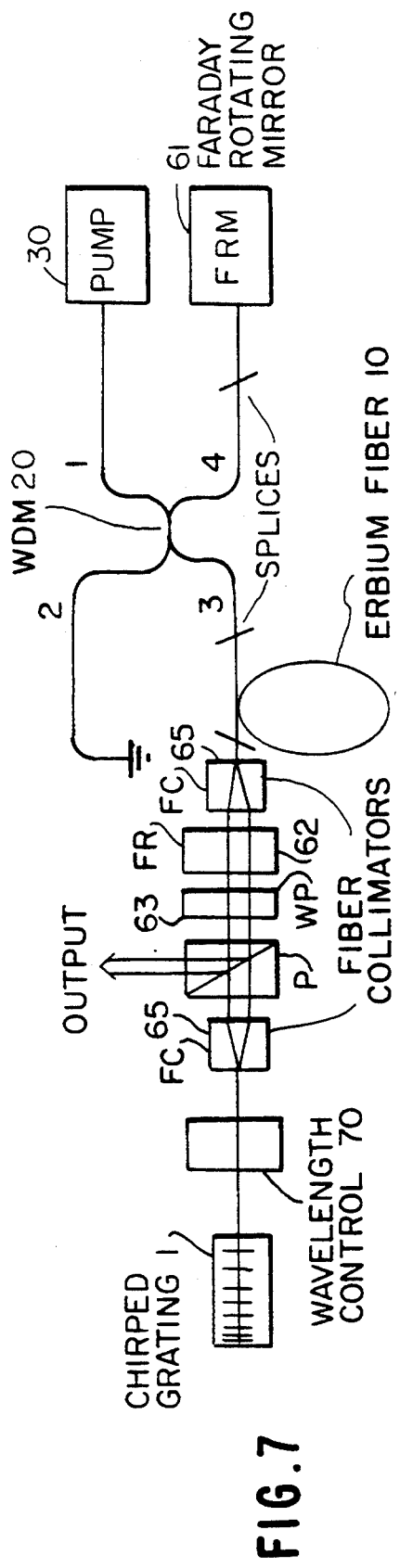
FIG. 7 illustrates an embodiment similar to that in FIG. 6, with an additional provision for wavelength control by the incorporation of an optical filter.

The cavity designs of FIGS. 5 and 6 also allow wavelength tuning by a wavelength tuning element, though due to the strong coupling to the saturable absorber 52 in FIG. 5, the tuning range of that design will be limited. An environmentally stable cavity design as in FIG. 6 with the provision for wavelength tuning by a separate wavelength tuning element 70 (such as a birefringent filter or a tunable Fabry-Perot filter) is shown in FIG. 7. In addition to providing a separate wavelength tuning element, the reflectivity function of the grating could be itself tuned by either heating or stretching of the fiber grating. Moreover, an active modelocked element such as an acoustic-optic or electro-optic device running off RF can be incorporated for start-up and for timing the laser to an external electrical signal, as discussed in more detail with respect to FIG. 10.

Figure 8:
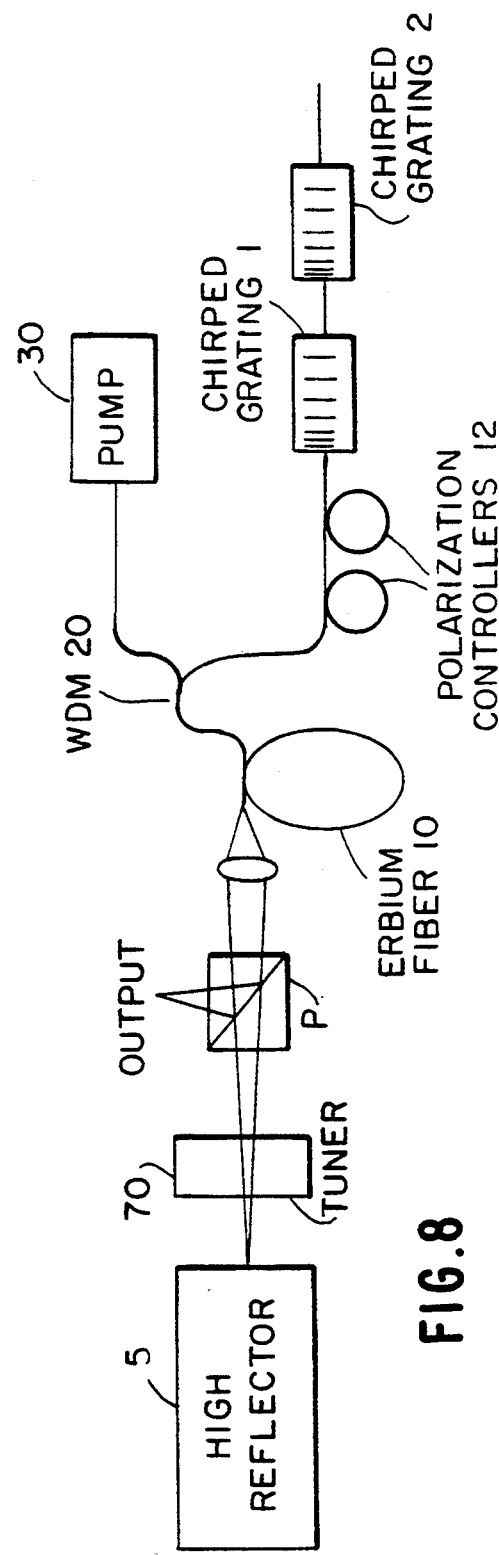
FIG. 8 illustrates a dual-wavelength fiber laser incorporating two chirped fiber gratings with well-separated reflection profiles to obtain modelocking at two different wavelengths with two different repetition rates. The wavelength tuning element (tuner) is optional and can be adjusted to equalize the cavity loss for the two wavelengths.

The laser could also be adjusted to operate simultaneously on two or more wavelengths by incorporating two or more wavelength tuning elements or by using gratings with well-separated reflection profiles. For this application the chirped gratings have to have well-separated reflection profiles in order to prevent leakage of a pulse at one wavelength to the other pulses at the other wavelengths, which would lead to instabilities in laser performance. The use of gratings with different reflection profiles also offers the option of setting the repetition rate of the pulses at the different wavelengths independently by positioning the gratings at certain positions within the cavity. An example of a cavity design with two gratings 1,2 with assumed well-separated reflection profiles for dual-wavelength operation of the laser is shown in FIG. 8.

Figure 9:
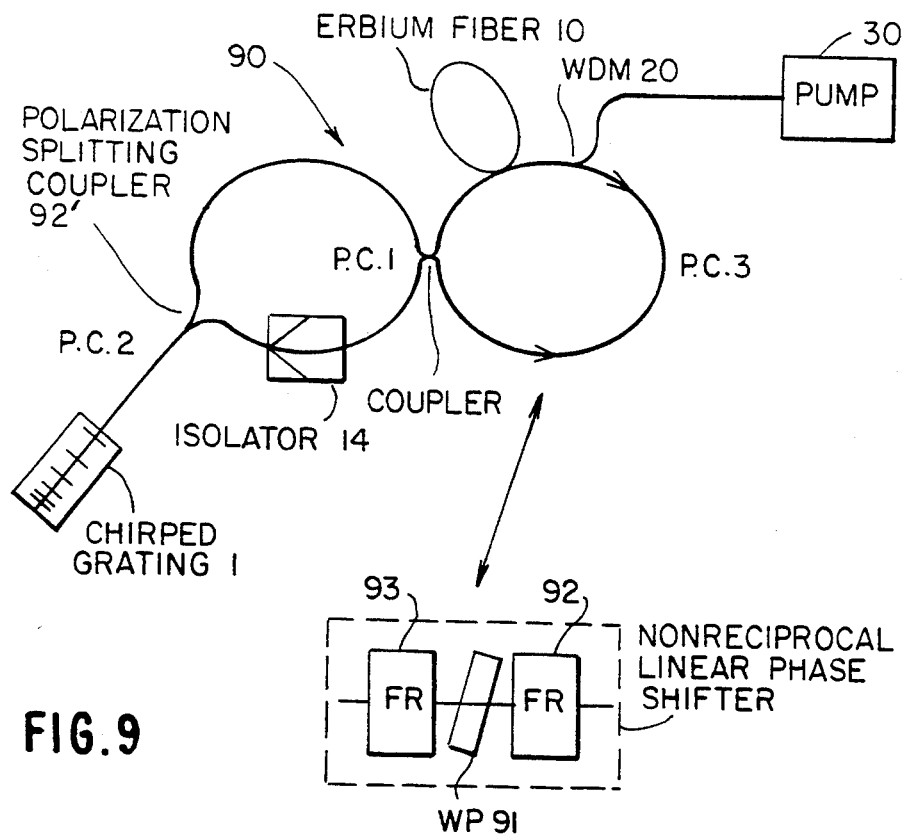
FIG. 9 illustrates a Figure Eight laser with an incorporated chirped fiber grating to increase laser stability. For the case of a polarization maintaining cavity design a nonreciprocal linear phase shifter can be used instead of the polarization controller PC3 to optimize modelocking.

The use of chirped Bragg gratings to optimize the performance of modelocked lasers is not limited to fiber lasers where nonlinear polarization evolution is used as the modelocking mechanism. Essentially, any laser system can benefit from the addition of chirped Bragg gratings. Particularly attractive are ring fiber lasers or, in particular, double-ring fiber lasers, commonly referred to as FIG. Eight lasers (as discussed by Noske et al). An example of a Figure Eight laser 90 with an incorporated chirped fiber Bragg grating 1 is shown in FIG. 9. To minimize the loss in the cavity, the fiber Bragg grating is added via a polarization splitting coupler 92', where a first polarization controller PC1 is adjusted to generate linearly polarized light in front of the polarized splitting coupler; the polarization of the light reflected from the Bragg grating 1 being rotated by 90° via a second polarization controller PC2. This ensures that the light continues to travel along the fiber ring on the left-hand side of the cavity with the lowest possible loss. Here the isolator 14 ensures that the light propagation on the left hand side of the cavity is clockwise. A third polarization controller PC3 on the right-hand side of the cavity can also be incorporated to optimize modelocking performance. Output coupling could be obtained by incorporating an additional fiber coupler anywhere in the cavity; this output coupler is not shown separately.

Such cavity designs also allow for the incorporation of more than one chirped grating for multi-wavelength operation. To make such a system environmentally stable, most or all of the fibers and couplers may be polarization maintaining. To optimize modelocking in this case it is advantageous to use a non-reciprocal linear phase shifter (NLPS) instead of the third polarization controller PC3, as indicated by the arrows in FIG. 9. A NLPS consists of one or two waveplates 91 sandwiched between two 45° Faraday rotators 92, 93, as shown in the bottom of FIG. 9, and is well-known in the field. Here the NLPS induces a linear phase delay between the counterpropagating pulses on the right hand side of the laser cavity.

Figure 10:
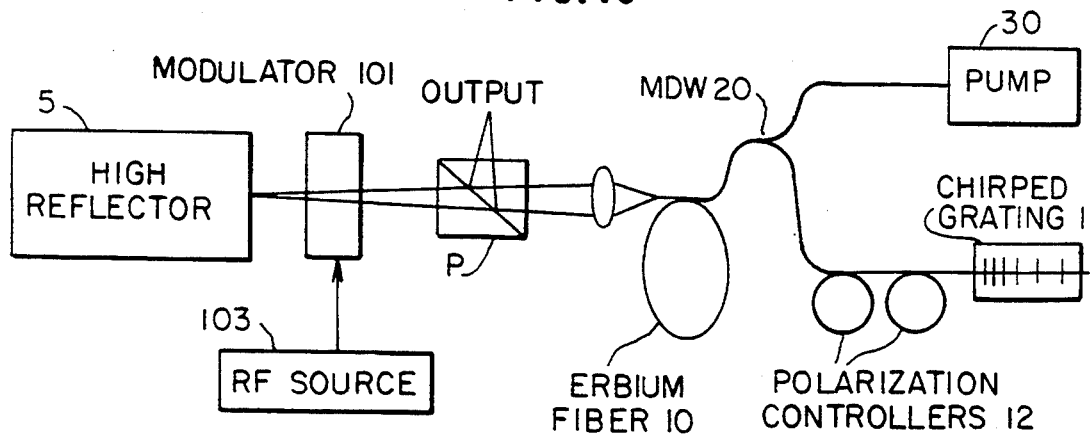
FIG. 10 illustrates a fiber laser incorporating a chirped fiber grating and an acousto- or elecro-optic modulator (AO) to start up passive modelocking or to lock the generated pulse train to an external electrical clock.

As another modification to the cavity design, an active modelocking element 101, such as an acousto- or electro-optic modulator running off an electrical signal source, typically an RF source 103, can also be incorporated into the cavity. An active modelocking element can be used to start up passive modelocking. An active modelocking element can also be used for timing the generated pulses to an external electrical clock, as is commonly used in optical communications. An example of a cavity design incorporating a chirped Bragg grating 1 and an active modelocking element 101 is shown in FIG. 10.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A modelocked laser comprising:
   means for generating laser energy;
   a gain medium for amplifying said laser energy within a laser cavity;
   means for reflecting said energy along an axis which passes through the gain medium:
   a modelocking mechanism for inducing modelocking of said laser, and sustaining a high non-linearity within the laser cavity;
   means for outputting laser energy generated within said cavity; and
   a dispersive delay line comprised of at least one chirped grating, for controlling a pulse width of said output laser energy.

2. A modelocked laser according to claim 1, wherein a plurality of chirped gratings of same or different dispersions are used as dispersive delay line elements.

3. A modelocked laser according to claim 2, wherein at least one of said plurality of chirped gratings further serves as said energy reflecting means.

4. A modelocked laser according to claim 1, further comprising an optical filter in said cavity for wavelength tuning.

5. A modelocked laser according to claim 1, further comprising wavelength tuning means including means for controlling intra-cavity loss and polarization state.

6. A modelocked laser according to claim 1, further comprising wavelength tuning means including means for inducing a change of reflectivity of said grating by changing an operating temperature of said grating or stretching of the grating.

7. A modelocked laser according to claim 1, further comprising wavelength tuning means including means for inducing a change of reflectivity of said grating by stretching of said grating.

8. A modelocked laser according to claim 1, wherein said chirped grating comprises a chirped fiber or waveguide grating.

9. A modelocked laser according to claim 1, wherein said gain medium comprises one of an optical fiber and optical waveguide, doped with a gain material.

10. A modelocked laser according to claim 9, further comprising a Faraday mirror for elimination of linear phase drifts between polarization eigenmodes of the fiber, fiber polarization controllers for controlling the polarization state of the fiber laser, waveplates for controlling linear phase delay between polarization eigenmodes of the laser, and an intra-cavity polarizer for selecting a single polarization state in the fiber laser.

11. A modelocked laser according to claim 10, wherein at least one polarization maintaining fiber is included in said cavity to minimize sensitivity of the laser performance to mechanical perturbations.

12. A modelocked laser according to claim 9, wherein said modelocking mechanism comprises nonlinear polarization evolution in the fiber as a main modelocking mechanism.

13. A modelocked laser according to claim 1, wherein modelocking of said laser is initiated by inducing a cavity perturbation for self starting.

14. A modelocked laser according to claim 1, wherein said modelocking mechanism includes a saturable absorber coupled internally of or externally to said cavity, for use in self starting of modelocked laser oscillation.

15. A modelocked laser according to claim 1, wherein said modelocking mechanism comprises passive modelocking with one of Kerr-type modelocking and saturable absorber modelocking, as a main modelocking mechanism of said laser.

16. A modelocked laser according to claim 15, wherein said passive modelocking technique comprises non-linear polarization evolution.

17. A modelocked laser according to claim 1, wherein said gain medium comprises a doped optical fiber and said chirped grating comprises a chirped waveguide grating.

18. A modelocked laser according to claim 17, wherein said modelocking mechanism comprises non-linear polarization evolution in the fiber as a main modelocking mechanism.

19. A modelocked laser according to claim 1, wherein at least one polarization maintaining fiber is included in the cavity to minimize sensitivity of the laser performance to mechanical perturbations.

20. A modelocked laser according to claim 1, further comprising a plurality of wavelength tuning means for controlling intra-cavity loss and polarization state, to obtain modelocking at a plurality of wavelengths simultaneously.

21. A modelocked laser according to claim 1, wherein said laser is a modelocked Figure Eight laser including a plurality of polarization controllers.

22. A modelocked laser according to claim 21, wherein said gain medium is coupled to a nonreciprocal linear phase shifter arranged within said cavity for modelocking optimization.

23. A modelocked laser according to claim 1, wherein said modelocking mechanism includes an active modelocker coupled to a source for external timing.

24. A modelocked laser according to claim 23, wherein said active modelocker is one of an electro-optic and acousto-optic modulator.

25. A modelocked laser according to claim 1, wherein a pair of chirped gratings are arranged in said cavity, said gratings having respectively separated reflection profiles, for promoting modelocked operation of said laser at two wavelengths simultaneously.

* * * * *